C. E. LARRABEE.
TIME RECORDER.
APPLICATION FILED APR. 14, 1913.

1,088,077.

Patented Feb. 24, 1914.
7 SHEETS—SHEET 1.

Fig. 1.

WITNESSES

INVENTOR
C. E. Larrabee
BY
Kerr, Page, Cooper & Hayward
ATTORNEYS

C. E. LARRABEE.
TIME RECORDER.
APPLICATION FILED APR. 14, 1913.

1,088,077.

Patented Feb. 24, 1914.
7 SHEETS—SHEET 3.

WITNESSES

INVENTOR
C. E. Larrabee
BY
ATTORNEYS

C. E. LARRABEE.
TIME RECORDER.
APPLICATION FILED APR. 14, 1913.

1,088,077.

Patented Feb. 24, 1914.
7 SHEETS—SHEET 6.

WITNESSES
William P Johnson
S. S. Dunham

INVENTOR
C. E. Larrabee
BY
Kerr, Page, Cooper & Hayward
ATTORNEYS

UNITED STATES PATENT OFFICE.

CLINTON E. LARRABEE, OF BINGHAMTON, NEW YORK, ASSIGNOR TO INTERNATIONAL TIME RECORDING COMPANY OF NEW YORK, OF ENDICOTT, NEW YORK, A CORPORATION OF NEW YORK.

TIME-RECORDER.

1,088,077.

Specification of Letters Patent. Patented Feb. 24, 1914.

Application filed April 14, 1913. Serial No. 760,951.

*To all whom it may concern:*

Be it known that I, CLINTON E. LARRABEE, residing at Binghamton, in the county of Broome and State of New York, have invented certain new and useful Improvements in Time-Recorders, of which the following is a full, clear, and exact description.

In time recorders which print on a record-sheet the times of arrival and departure of employees it is customary to provide relative movements in two directions in the same plane, between the record sheet and the printing devices or type-wheels, one movement being at right angles to the other. Thus in the so-called "card machine", in the common form of which each workman has his own record sheet or card which is dropped into a vertical chute or receiver, the card is raised each day to bring a new horizontal day-line to the impression point and is shifted laterally at suitable times to space the "in-and-out" imprints on the particular day-line that happens to be at the printing position. In the so-called "dial machine", in the common form of which the record-sheet is wrapped around a cylindrical drum and bears the records of a plurality of workmen, the drum is rotated on its axis to bring the different workmen's record-lines to the printing point, and the drum or the printing wheels are shifted at the proper times in a direction parallel to the drum's axis to space the in-and-out imprints.

By such methods as the above the times of arrival and departure of the employees are kept separate and distinct on the record sheet, and the workman's pay is therefore calculated on the basis of a record which he himself makes and which is constantly open to his inspection. If the workman arrives late or departs early, the fact appears in the record and the exact time he was at work can be deducted. This involves scrutiny of each imprint, to see if it is late or early, or, in other words, "irregular"; and as such examination of each imprint consumes considerable time in the aggregate, particularly if the number of records to be examined is large, it has been proposed to print "regular" and "irregular" registrations with distinctive characteristics, as for example by printing the regular or on-time registrations in blue, and the irregular or late-arrival and early-departure registrations in red. Then a mere glance at the workman's record is sufficient to show whether on any day he arrived late or left early. That invention, described in U. S. Letters Patent of Dey and Dey, No. 786,011, has gone into extensive use and has proved to be of great practical value.

My present invention is designed to provide a time recorder which shall make the regular and irregular registrations sharply distinctive, without, however, the necessity of printing them in different colors. For this purpose the machine is so constructed and organized that the regular and irregular registrations are printed on different parts of the record sheet, with the result that a glance at the record, as in the case of the two-color scheme, will show whether the workman has been absent or irregular within the period covered by the record.

To this and other ends the invention consists in the novel features of construction and combinations of elements hereinafter described.

The invention is applicable to a great variety of time recorders, but in the accompanying drawings I have shown only one embodiment of the invention, applied to a card-machine of the type described in my prior Patent No. 935,312, issued September 28th, 1909.

Referring now to the drawings.

Figure 2:
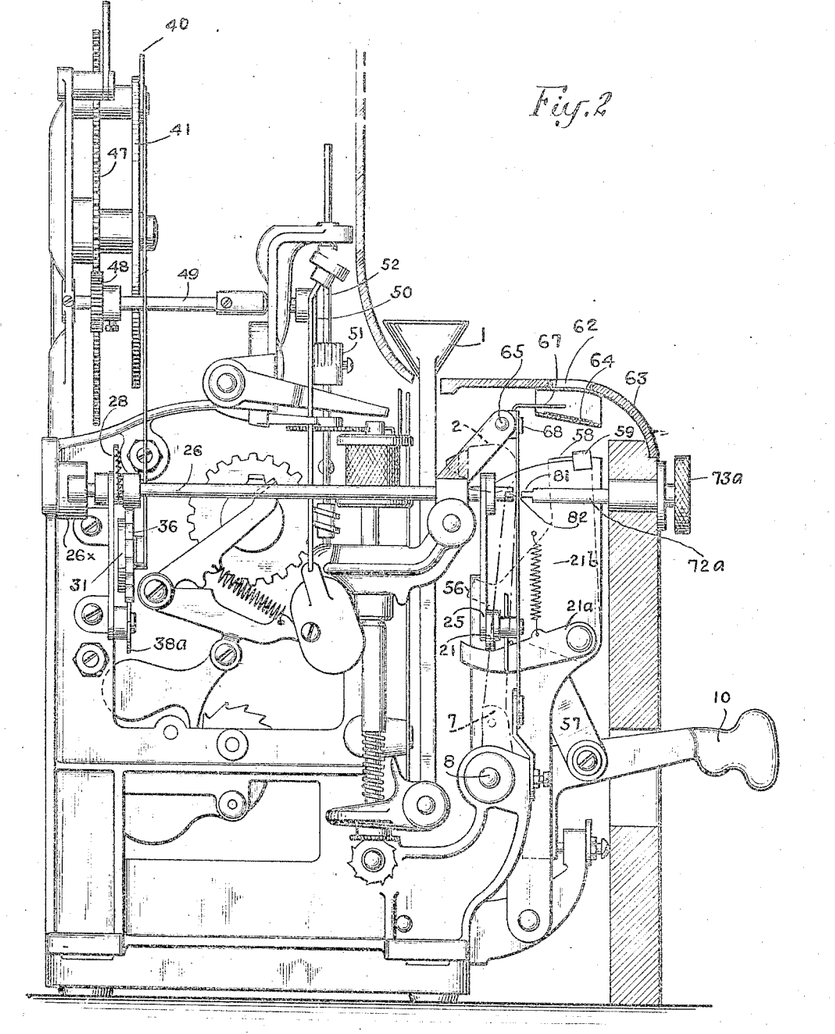
Fig. 2 is a side view of the same, showing also a portion of the casing.

The record-support which carries or supports the record-sheet is in the present instance a card-receiver, designated by 1, which is open at the top to receive the card and has its central portion open to permit the printing hammer 2, (Figs. 2 and 3), to carry the card rearwardly against the ink-ribbon 3 and the time-printing devices or wheels indicated by 4. The receiver is mounted to slide laterally on rails 5, 6, and means are usually provided to limit the depth of insertion of the record card, for the purposes before mentioned.

Figure 1:
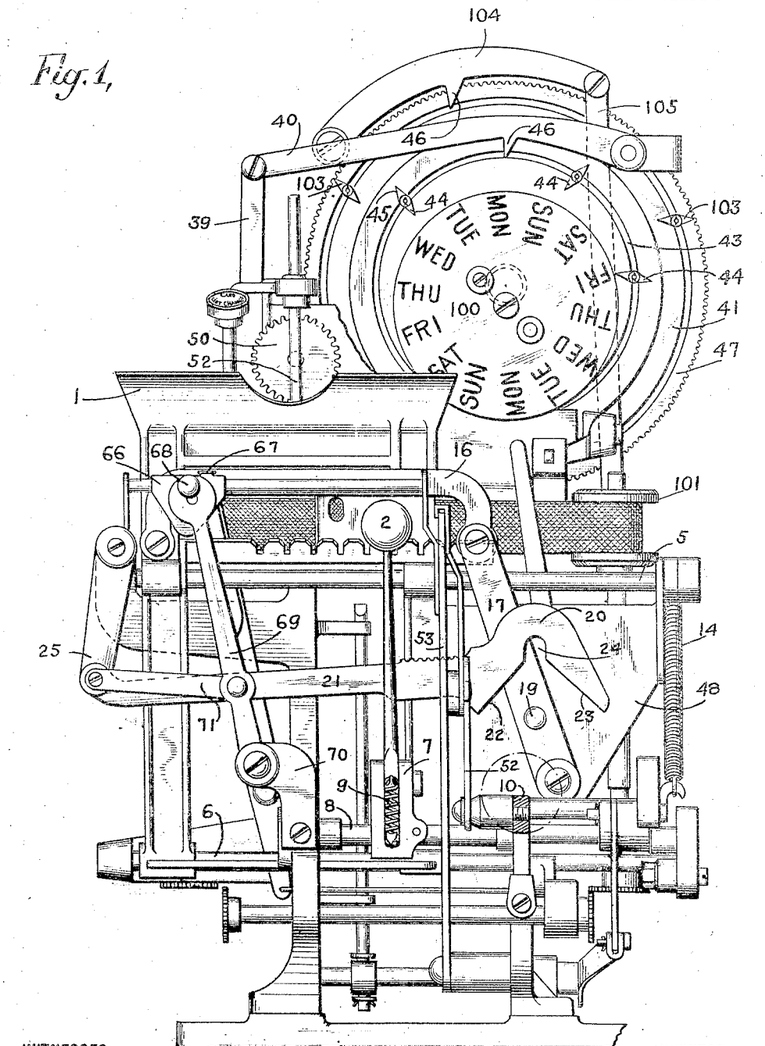
Figure 1 shows the apparatus in front elevation, without the clock and the usual inclosing casing.
Figure 3:
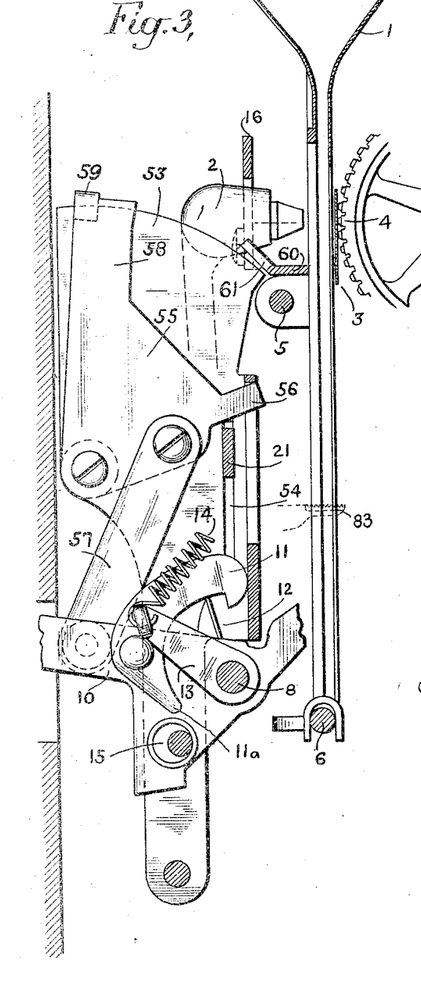
Figs. 3 and 4 are detail side views, partly in vertical section, showing different operative positions of certain parts of the apparatus.

The printing hammer is pivoted in a bifurcated arm 7, fast to a transverse shaft 8 and is normally held slightly retracted from contact with the record card (when the same is in the chute or receiver) by a spring 9, Fig. 1. Loose on the shaft 8 is the manual operating lever 10 which the operator actuates to effect a registration, and pivoted on said lever is a trip finger or pawl 11 arranged to engage a finger 12 rigidly mounted on shaft 8. Fast to the same shaft is an arm 13, connected to a spring 14 which urges the shaft in the clockwise direction (as seen in Figs. 3 and 4) and hence tends to throw the hammer 2 toward the card-receiver.

Figure 4:
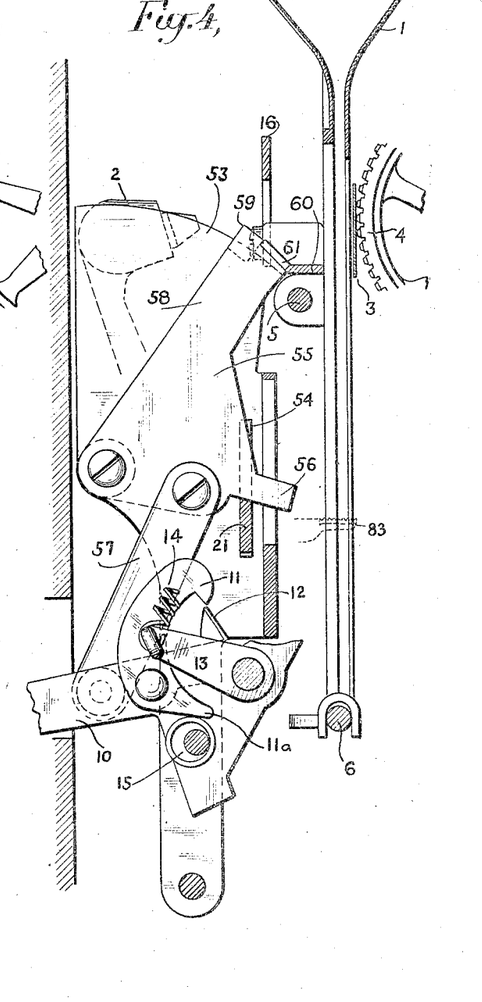

From the foregoing it will be seen that on depression of the lever 10 the pawl or hooked finger 11, engaging the finger 12, will retract the same, thereby rocking the shaft 8 and retracting the printing hammer as shown in Fig. 4. As the operating lever descends, the depending end 11$^a$ of the hooked finger or pawl 11 engages a cam-stop 15, on a fixed part of the apparatus, with the result that the pawl is lifted out of engagement with the finger 12, as is clearly shown in Fig. 4; whereupon the spring 14 acts to rock the shaft 8 and throw the printing hammer against the record-sheet. Having struck its blow the hammer is caused to rebound by the spring 9. On release of the operating lever 10 the latter is raised to its normal position by a suitable spring (not shown) and the hooked pawl 11 rides over the finger 12, as shown in Fig. 3.

Figure 5:
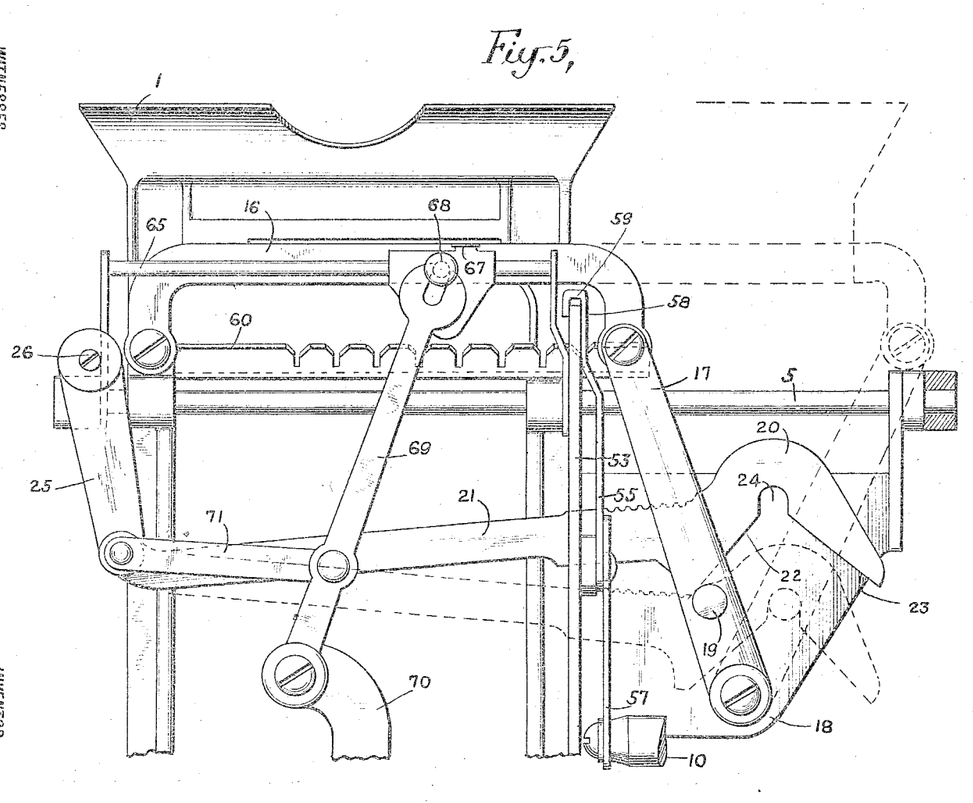
Fig. 5 is a detail front view showing different operative positions of the member which shifts the card-receiver.

For the purpose of adjusting the receiver laterally it is connected by a link 16, Figs. 1 and 5, arching over the printing hammer, to an arm or lever 17 pivoted at its lower end to a fixed plate 18. On the arm near its pivoted end is a stud 19, and immediately above the stud is the end 20 of a horizontally extending member 21, which is adjustable longitudinally in a substantially rectilinear path for the purpose soon to be explained. The end 20 of said member is provided with a downwardly opened V-shaped notch having oppositely inclined edges 22, 23, and terminating at its apex in a slot or notch 24 adapted to fit the stud 19. Assuming the parts to be in the position shown in Fig. 1, it will now be clear that if the member 21 be shifted to the right (as in Fig. 5 for example) and its end 20 depressed, the edge 22, engaging the stud 19, will swing the arm 17 to the right and with it the receiver 1 until the slot 24 engages the stud, as shown in dotted lines in Fig. 5. Moreover, it is evident that if the receiver had previously been moved far enough to the right to bring the shifting stud 19 under the inclined edge 22 the arm 17 would on depression of the member 21, be carried leftwardly and with it the receiver. It will therefore be seen that no matter in what position the receiver may be, the member 21 will, when depressed, shift the receiver and locate it in a position corresponding to the adjustment of said member. From this function the member 21 may be conveniently termed the locating member or bar. Said member is normally held in its raised position by a pivoted arm 21$^a$, Figs. 2 and 6, elevated by a spring 21$^b$.

Figure 8:
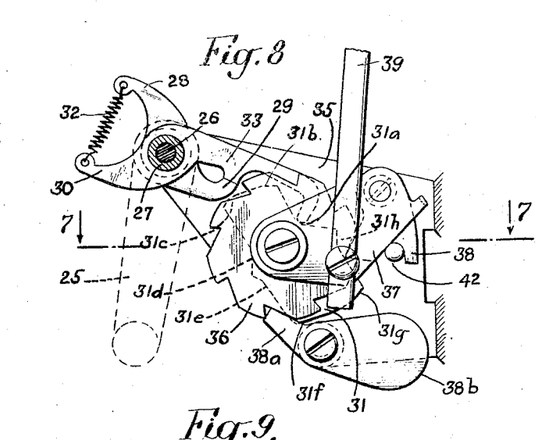
Fig. 8 is a section on line 8—8 of Fig. 6, looking in the direction of the arrows in each case.
Figure 9:
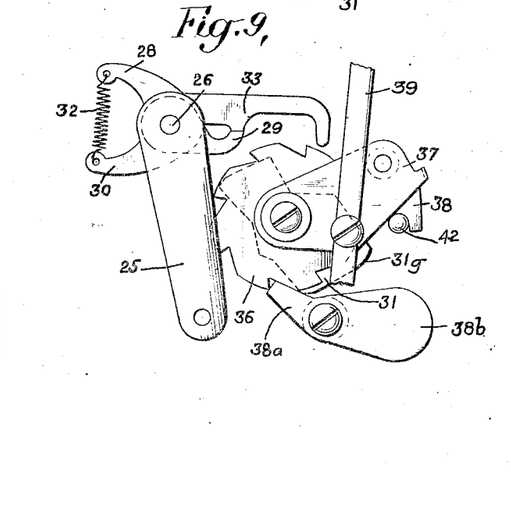
Figs. 9 and 10 are views similar to Fig. 8 but showing different operative positions of certain parts.
Figure 10:
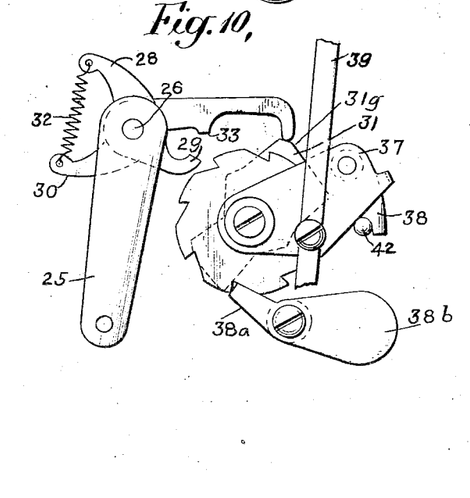

For the purpose of adjusting or shifting the locating member to right or left as necessary to bring about the results described above, it is pivotally connected at its left end to an arm 25 fast to a rearwardly extending rock-shaft 26. At the rear end of the shaft (see Figs. 2, 6 and 8) and rigidly connected thereto is a sleeve 27, and fast to the sleeve is a lever 28 one end of which is formed as a stop 29. Loose on the sleeve, alongside of the first lever, is a second lever, 30, having one end engaging a specially shaped cam 31 and its other end connected to lever 28 by a coil spring 32, serving, as will be readily understood, to hold the lever 30 in yielding engagement with the cam, and with the projection 33 resting on the stop-end 29 of lever 28, as shown in Fig. 8. The cam is rotatably supported by a stud or short spindle 34 on a fixed plate 35, and it will be seen that as the cam rotates (clockwise as seen in Fig. 8) the lever 30 will be rocked, carrying with it, through the medium of spring 32, the lever 28 and thereby rocking the shaft 26 counterclockwise. This movement of the shaft is counterclockwise as seen in Figs. 1 and 5. It will also be evident that by suitable independent means the shaft 26 can be rocked in either direction, since movement clockwise (as seen in Fig. 8) will separate the levers 28, 30, as shown in Fig. 10, while movement counterclockwise will simply lift the lever 30 off the cam, as shown in Fig. 9. Thus by rotating the cam from the clock the shaft 26 will be rocked and the card-receiver shifted at predetermined intervals; while by means independent of the cam the shaft can be rocked and the receiver adjusted to any position at any time.

Figures 12, 13, 14:
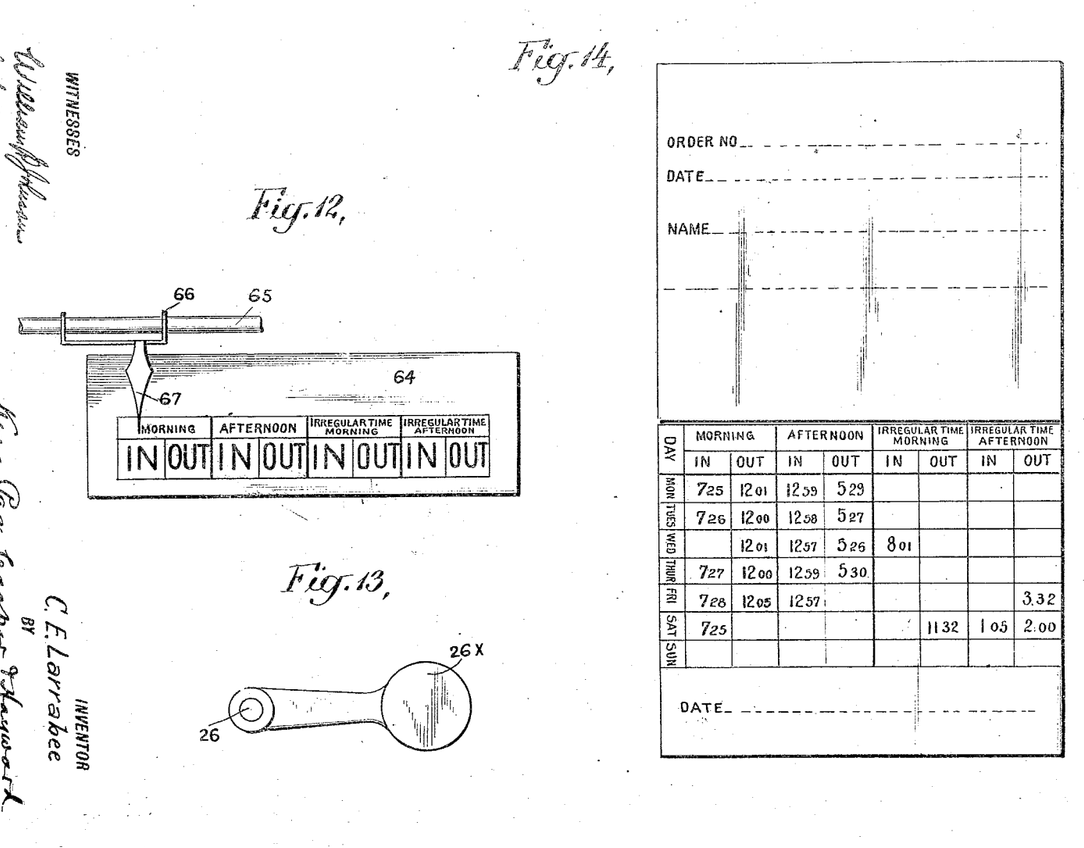
Fig. 12 is a detail view of the devices for indicating the position of the card-receiver.
Fig. 13 is a detail view of one of the parts associated with the receiver-shifting mechanism.
Fig. 14 is a view of a record card with registrations printed by the machine, showing "regular" registrations on the left-hand half and "irregular" registrations on the right-hand half of the card.

The record which my present machine is designed to make is shown in Fig. 14, in which it will be seen that the irregular registrations are printed on a portion of the card distinct from the portion devoted to regular registrations. This means that "in" registrations made after the hour of beginning work (7:30 a. m. for example) and up to, say, 9:00 a. m., must be printed in the irregular morning-in columns of the cards, which in turn means that the first shift of the locating member 21 must be made not to the regular morning-out but to the irregular morning-in position. Similar provisions must be made for the other irregular registrations.

The position taken by the receiver when adjusted by the cam depends upon the configurations and size of the cam and the proportions of the associate parts. The cam employed in the present embodiment of my invention is shown in initial, or "regular" morning-in, position, in Fig. 8, in which it will be seen that the wiper or lever 30 lies in a drop $31^a$. The particular cam illustrated is designed to cause the record-receiver or support to be shifted at predetermined times to regular positions which are consecutive in space though not always successive in respect of the times at which the shifts are made; and, at appropriate times intermediate to the instants at which the receiver is shifted from one regular position to the next consecutive regular position, to irregular positions which are consecutive in space though not always successive in time. At a suitable time in the forenoon, after the beginning of work, the cam is rotated one-eighth of a revolution (by suitable mechanism hereinafter described) in the clockwise direction, and the rise $31^b$ comes under the wiper and moves the locating member 21 rightwardly (as seen in Fig. 1) to such position that when it is depressed it will bring the record-sheet support 1 to the irregular morning-in position. The locating member remains in this position till a suitable time (for example 9:00 a. m.), and then the cam is given another one-eighth turn, bringing the rise $31^c$ under the wiper. This shifts the locating member still farther forward, or to the right, so that at the next imprint the locating member will shift the card-receiver to the irregular morning-out position. At the end of the morning period of work,—noon, for instance,—the cam receives a third impulse, which brings the drop $31^d$ under the wiper and moves the locating member backwardly to the position at which the card-receiver will be shifted to the regular morning-out position. At the proper time, say 12:15 p. m., as an example, the cam is given a fourth impulse, bringing the rise $31^e$ under the wiper and shifting the locating member a short distance forward or toward the right, far enough to bring the regular afternoon-in column to the impression point. Here the locating member remains until the beginning of the afternoon period of work, say until 1:00 p. m., at which time a fifth impulse is given to the cam. This brings the rise $31^f$ under the wiper and shifts the locating member again forward or toward the right, far enough to cause the next imprint to be made in the irregular afternoon-in column. At an appropriate time, for instance 2:00 p. m., a sixth impulse is imparted to the cam. This brings the rise $31^g$ under the wiper, which sets the locating member for registration in the irregular afternoon-out column of the record sheet. At this position the locating member remains until the end of the afternoon period, 5:00 p. m., for example, when the seventh impulse imparted to the cam brings the rise $31^h$ under the wiper, thereby shifting the locating member to the position for printing in the regular afternoon-out column. At midnight or at any other appropriate hour an eighth or final impulse is given to the cam, which brings the drop $31^a$ back under the wiper and restores the parts to initial or regular morning-in position.

From the above it will be seen that upon the usual and common travel of the card-receiver or record-sheet support from one regular position to the next there is imposed an additional travel to the appropriate irregular positions. Moreover, in the complete cycle the two travels alternate, in time, in groups of two positions each. Thus after the regular morning-in come two successive irregular positions, namely, irregular morning-in and irregular morning-out, followed by two regular positions, to wit, regular morning-out and regular afternoon-in. Then follow two irregular positions (irregular afternoon-in and irregular afternoon-out), after which come two regular positions—regular afternoon-out and regular morning-in; and so on, day after day.

Figures 6, 7:
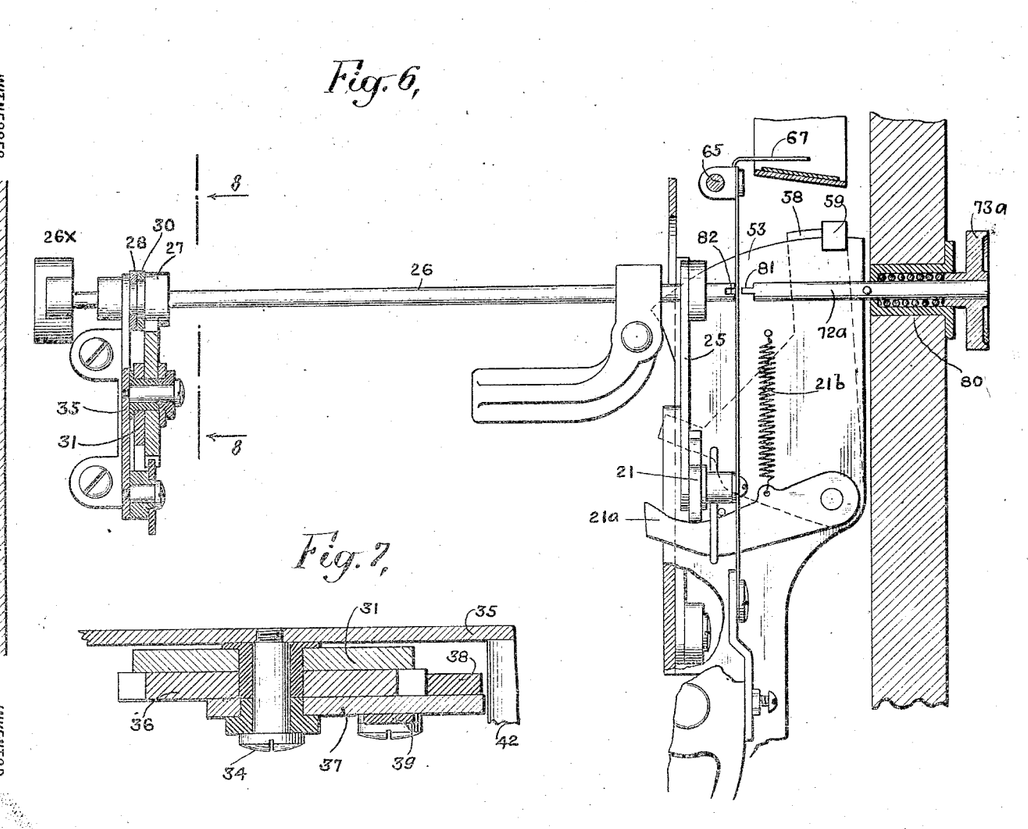
Fig. 6 is a detail side view, partly in section, showing the mechanism for setting the member which shifts the card-receiver.
Fig. 7 is a section on line 7—7 of Fig. 8.

The wiper 30 is held yieldingly on the cam 31 (through the medium of spring 32), and the locating member 21 is urged leftwardly as seen in Fig. 1, by a weighted arm $26^x$, Figs. 6 and 13, on the rear end of shaft 26.

Figure 11:
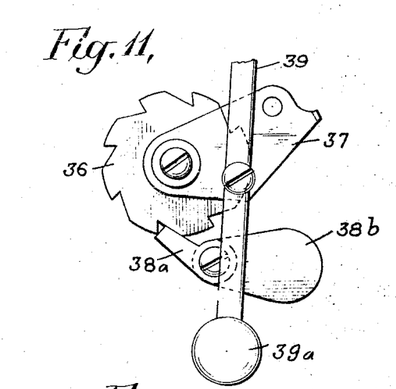
Fig. 11 is a detail view of part of the mechanism for rotating the cam which determines the position of the card-receiver.

The rotation of the cam 31 by the clock is effected by the following instrumentalities. Rigidly connected to the cam, on the same shaft or spindle, is a ratchet wheel 36 (Figs. 6, 7, 8, and 11) the number of whose teeth determines the number of steps taken by the locating bar (and hence the record-sheet support also) in the rightward and leftward movements thereof. Thus the ratchet illustrated has eight teeth; and hence at each movement of the ratchet corresponding to one tooth the locating bar will be shifted to the right or left, a distance depending upon the size and shape of the cam; and, after seven such adjustments have been effected the next or eighth movement of the ratchet will bring the cam and the locating member to their initial positions. At such position of the bar the card-receiver, when the bar is depressed, will be brought to its first regular position, for printing "regular morning-in". The other seven steps of the ratchet and cam provide for the several other regular and irregular registrations. Pivoted alongside of the ratchet is a pawl-carrier 37, on which is pivoted a pawl 38 in position to engage the ratchet. The pawl-carrier is itself connected by a vertical link 39 to a horizontal lever 40 (Fig. 1) pivoted at the right of the machine adjacent to a time-setting wheel 41. Thus at each upward movement of the lever 40 the pawl and its carrier will be raised, retracting the pawl over a tooth; and at each downward movement of the lever the pawl will advance the ratchet through an angle depending upon the location of the stop 42 with which the pawl engages; the location of the stop in the present instance being such that with an upward movement of lever 40 sufficient to carry the pawl backward over one tooth the downward movement of the pawl will rotate the ratchet through an angle equal in extent to one tooth, that is, one-eighth of a revolution. To give the downwardly moving pawl 38 sufficient force to actuate the ratchet with certainty the lower end of link 39 may be provided with a weight 39ª, Fig. 11, and to hold the ratchet against possible reverse movement during retraction of the pawl, a holding pawl 38ª is provided, pivoted on the plate or bracket 35 and maintained in engagement with the ratchet by its weighted end 38ᵇ.

The time-setting wheel 41 has a circular recess or slot 43, and adjustably mounted in the slot is a series of lifters 44, each having an inclined cam face or edge 45 to engage the correspondingly inclined edge of a lug or projection 46 on lever 40. Hence as the wheel rotates (counterclockwise as seen in Fig. 1) each lifter engaging the lug will raise the lever 40 a distance depending, in general, upon the size and relative proportions of the parts and on the position of the lug 46 on its lever. In the machine illustrated it is intended that each upward movement of the lever will be sufficient in extent to retract the pawl 38 past one tooth on the ratchet.

Rigidly connected with the time-setting wheel 41 is a gear 47 in mesh with a pinion 48 fast to a shaft 49 which also has fast to it a gear 50. The latter meshes with a pinion 51 on a vertical shaft 52 connected by any suitable means (not shown) to the clock (not shown) so as to be rotated thereby. It will therefore be seen that the time-setting wheel 41 will be driven by the clock, at a rate dependent, for a given rate of rotation of the shaft 52, upon the proportions of the gears and pinions just mentioned, in accordance with the well understood principles of toothed gearing. Thus the time-setting wheel may be made to rotate at any convenient rate. In the machine illustrated, in which the cam 31 is used, the wheel 41 revolves once in twenty-four hours, and hence eight lifters 44 are employed (only three being shown), arranged so as to lift the lever 40 at the times at which adjustment of the locating bar 21 is desired. Of course the wheel may revolve at practically any desired rate, the number and positions of the lifters being varied accordingly as will be readily understood.

The locating bar or member 21 is depressed by the devices now to be described. Fixed alongside of the printing hammer 2 is a vertical frame-plate 53, (Figs. 1, 2, 3, and 4), having a vertical slot 54 in which the locating bar moves. Pivoted to the frame plate is an actuating plate 55, provided with a rearwardly extending finger 56 projecting over and engaging the locating bar. The actuating plate is connected to the main operating lever 10 by a link 57, so that as the lever is depressed to effect a time registration the plate 55 will be swung rearwardly, thereby carrying the finger 56 downward and depressing the locating bar. Remembering that the printing hammer is not tripped or released to strike its blow until the main operating lever is fully depressed, as shown in Fig. 4, it will be seen that by that time the locating bar will likewise be fully depressed, as in the figure just mentioned, and the card-receiver located in adjusted position. Thus at each printing operation the receiver is first brought to the position of adjustment corresponding to the position of the locating bar, which latter is of course, in the normal operation of the machine, set by the clock.

Extending slightly above the frame-plate 53, the top of which is arc-shaped with its center of curvature at the pivot of the actuating plate 55, is an extension 58 of the actuating plate, having a guide finger 59 embracing said arc-shaped top. Fixed to the card-receiver 1 is a plate 60, having its forward part bent upward and provided with a series of flaring notches 61, eight in number, arranged in correspondence with the eight positions of the receiver. When the actuating plate 55 is depressed, the end of the extension 58 enters the notch which has been presented thereto by the movement of the receiver through depression of the locating member. If for any reason the fit between the stud 19 on arm 17 and the slot 24 in the locating bar should not be close, and the receiver therefor not accurately in position, the locking extension 58, striking one or the other inclined side of the notch in plate 60, cams the receiver into the exact position required, as will be readily understood.

Under a window 62 (see Fig. 2) in the casing 63 in front of the card receiver is an indicator plate 64 bearing the designations "In," "Out," etc., as shown in Fig. 12. Sliding on a rail 65 arranged parallel with the path of the card-receiver is an index carriage 66 having an index 67 extending over the indicator plate. On the front of the carriage is a stud 68, engaging the slotted end of an arm or lever 69 (see Figs. 1 and 5) pivoted at its lower end to a fixed member 70 and pivoted intermediate of its ends to a link 71. The latter is connected to the pivotal connection between the locating member 21 and its adjusting arm 25, so that as said arm is swung by the rocking of shaft 26 as previously described, the lever 69 will be swung in correspondence therewith and will carry the index 67 to the proper designation on the indicator plate 64, thus indicating to the operator the position which the card-receiver will take when he depresses the printing or main operating handle 10.

As before stated, the locating bar 21 can be adjusted at will independently of the clock-driven cam 31. For this purpose the following devices are provided. Rotatably mounted in the front of the casing 63 is a short shaft or stem 72ᵃ (Figs. 2 and 6) which is also longitudinally movable in its bearing but is normally held in its outermost or forward position by a spring 80. The rear end of the shaft has a flat stud 81, adapted to enter a corresponding slot 82 in shaft 26 when the stem 72ᵃ is pressed inward. The shaft 26 can thus be rocked in either direction, and with it the locating member 21; while on release of the knob 73ᵃ by the operator the spring 80 at once retracts the stem from engagement with the shaft. In this manner the locating member 21 can be carried to the right or left of the machine; and since the index 67 follows the movement of the locating member to right and left, the operator can easily set the mechanism to bring the card-receiver to any position desired. For example, a workman arriving very late in the afternoon may find the index standing over the "Irregular afternoon-out," thus showing that the imprint would be made in the irregular afternoon-out column, whereas it should be made in the "Irregular afternoon-in" column. He therefore turns the setting knob 73ᵃ until the index 67 points to the requisite "In" space and then actuates the lever 10, whereupon the record is made in the proper column on his card.

As previously stated, in time-recorders of the type illustrated the day-line which is presented to the impression point depends upon the depth to which the card is inserted in the receiver, and this depends upon the positions of the bottom of the receiver, commonly known in the art as the "abutment" or "card-lift," which is vertically adjustable. This abutment, indicated in dotted lines at 83, Figs. 3 and 4, is operated by any suitable time-control mechanism, such, for example, as that described in Cooper Patent No. 528,223. The particular day-line which happens to be at the impression point is shown by an indicator disk 100 in the usual way.

As explained at the outset, it is also customary, in time-recorders of various types, to provide for printing "irregular" registrations in a color contrasting with that in which "regular" records are printed. Though not necessary, the two-color feature may be combined with my present invention. For this purpose the ink-ribbon spools 101, which carry the two-color ribbon 102, are adjustable vertically by suitable mechanism (not shown) actuated by lifters 103 on the wheel 47, similar to those employed on the time-setting wheel 41. These lifters 103 at the proper times raise a lever 104 operatively connected with the aforesaid mechanism by a link 105.

It is to be understood that the invention is not limited to the specific construction herein described but can be embodied in other forms without departure from its proper spirit and scope as defined by the appended claims.

What I claim is:

1. In a time-recorder adapted to print on a record-sheet regular and irregular time-records distinguishable one class from the other by difference in the positions of the imprints on the record-sheet, the combination of printing devices and a record-sheet support constituting elements of a printing couple having a relative movement of adjustment, time-controlled adjusting means operating at predetermined times to locate the regular imprints and at intermediate times to locate the irregular imprints, and means for bringing the record-sheet and the printing devices together to make the imprints.

2. In a time-recorder adapted to print on a record sheet regular and irregular time-records distinguishable one class from the other by difference in the positions of the imprints on the record-sheet, the combination of printing devices and a record-sheet, support constituting elements of a printing couple one of which is adjustable relatively to the other to a plurality of regular and irregular positions, time controlled means for shifting the adjustable element at predetermined times to regular positions and at appropriate intermediate times to irregular positions, and means for bringing the record-sheet and the printing devices together to make the imprints.

3. In a time-recorder adapted to print on a record-sheet regular and irregular time-records distinguishable one class from another by difference in the positions of the imprints, the combination of printing devices, a record-sheet support adjustable to a plurality of regular and irregular positions, time-controlled means for shifting the record-sheet support at predetermined times to regular positions and at appropriate intermediate times to irregular positions, and means for bringing the printing devices and the record-sheet together to make the imprints.

4. In a time-recorder adapted to print on a record-sheet regular and irregular time-records distinguishable one class from another by difference in the positions of the imprints on the record-sheet, the combination of printing devices, a record-support adjustable to a plurality of regular and irregular positions, time-controlled means for shifting the record-support to two regular positions successive in time, and to two irregular positions successive in time, alternately.

5. In a time-recorder adapted to print on a record-sheet regular and irregular time-records distinguishable one class from another by difference in the positions of the imprints on the record-sheet, the combination of printing devices and a record-sheet support constituting elements of a printing couple, a shiftable member associated with one of said elements to adjust same relatively to the other, a cam associated with said member to shift the same at predetermined times to regular positions and at intermediate times to irregular positions, time-controlled means to actuate the cam, and mechanism for bringing the record-sheet and the printing devices together to make the imprints.

6. In a time-recorder adapted to print on a record-sheet regular and irregular time-records distinguishable one class from the other by difference in the position of the imprints on the record-sheet, the combination of printing devices and a record-sheet support constituting elements of a printing couple, one of said elements being adjustable relatively to the other; a locating member shiftable independently of the adjustable element, for shifting the latter to positions determined by the position of the former; time-controlled means for shifting the locating member at predetermined times to consecutive regular positions and at intermediate times irregular positions nonconsecutive with the regular positions; and means for bringing the printing devices and the record sheet together to make the imprints.

7. In a time-recorder adapted to print on a record sheet regular and irregular time-records distinguishable one class from the other by difference in the positions of the imprints on the record-sheet, the combination of printing devices and a record-sheet support constituting elements of a printing couple, one of said elements being adjustable relatively to the other, time-controlled means for giving the adjustable element a travel through a series of consecutive regular positions and imposing thereon a travel through a series of consecutive irregular positions.

8. In a time-recorder adapted to print on a record-sheet regular and irregular time-records distinguishable one class from the other by difference in the positions of the imprints on the record-sheet, the combination of a record-sheet support, and mechanism for shifting the record-sheet support relatively to the impression point through a series of consecutive regular positions and through a series of consecutive irregular positions wholly beyond the said series of regular positions.

9. In a time-recorder adapted to print on a record sheet regular and irregular time-records distinguishable one class from the other by difference in the positions of the imprints on the record-sheet, the combination of a record-sheet support movable in a rectilinear path past the impression point, mechanism for shifting the support to two successive regular positions, then to two successive irregular positions beyond the regular positions, and so on alternately, said mechanism including a cam having rises and drops to determine the sequence and extent of the movement of the support, and time-controlled means to actuate the cam.

10. In a time-recorder adapted to print on a record-sheet regular and irregular time-records distinguishable one class from the other by difference in the positions of the imprints on the record-sheet, the combination of a record-sheet support; and means for shifting the support to regular and irregular positions, including a rotary cam having a drop followed by two rises, a drop, three rises, and a drop; and time-controlled mechanism to actuate the cam at appropriate times.

11. In a time-recorder adapted to print on a record-sheet regular and irregular time-records distinguishable one class from the other by difference in the positions of the imprints on the record-sheet, the combination of a record-sheet support, an adjustable locating member adapted to shift the said support, a time-controlled cam associated with the locating member to adjust the same and having a series of rises and drops to shift the locating member in a rectilinear path through a series of consecutive regular positions and through a series of consecutive irregular positions wholly beyond the series of regular positions, and means for actuating the locating member to shift the record-sheet support.

12. In a time-recorder adapted to print on a record sheet regular and irregular positions distinguishable one class from the other by difference in the positions of the imprints on the record sheet, the combination of a record-sheet support shiftable laterally to position the record-sheet relatively to the impression point, an adjustable locating member to shift the support, a cam having a series of rises and drops to shift the locating member through a series of consecutive regular positions and through a series of consecutive irregular positions wholly beyond the regular positions, clock-driven means to actuate the cam at appropriate intervals, mechanism for actuating the locating member to shift the record-sheet support, mechanism for making the time-imprints on the record sheet, and manual actuating means common to said mechanisms to actuate the same in the order named.

13. In a time-recorder adapted to print on a record sheet regular and irregular time-records distinguishable one class from another by difference in the positions of the imprints, the combination of a record-sheet support shiftable relatively to the impression point, an adjustable locating member associated with the support to shift the same, a rock-arm connected with the locating member to adjust the same, a cam on which rock-arm bears for actuation thereby, said cam having a series of rises and drops for shifting the locating member through a series of consecutive regular positions and through a series of consecutive irregular positions wholly beyond the regular positions, and manual means for actuating the locating member before each printing operation of the recorder.

14. In a time-recorder adapted to print on a record-sheet regular and irregular time-records distinguishable one class from the other by difference in the positions of the imprints on the record-sheet, the combination of a record-sheet support shiftable laterally past the impression point; means for shifting the support, including a rotary cam having a drop $31^a$, rises $31^b$ and $31^c$, drop $31^d$, rises $31^e$, $31^f$ and $31^g$, and drop $31^h$, arranged in the order named; and time-controlled mechanism to actuate the cam at appropriate times.

In testimony whereof I affix my signature in the presence of two subscribing witnesses.

CLINTON E. LARRABEE.

Witnesses:
L. F. GIBLIN,
M. BOLAND.